United States Patent
Saito (10) Patent No.: US 9,124,746 B2
(45) Date of Patent: Sep. 1, 2015

(54) IMAGE-READING DEVICE AND COMPUTER-READABLE STORAGE MEDIUM

(75) Inventor: Shingo Saito, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 33 days.

(21) Appl. No.: 13/537,961

(22) Filed: Jun. 29, 2012

(65) Prior Publication Data

US 2013/0083373 A1  Apr. 4, 2013

(30) Foreign Application Priority Data

Sep. 29, 2011 (JP) ................................ 2011-214254

(51) Int. Cl.
| | |
|---|---|
| H04N 1/04 | (2006.01) |
| H04N 1/387 | (2006.01) |
| H01L 27/00 | (2006.01) |
| H04N 1/00 | (2006.01) |

(52) U.S. Cl.
CPC ....... *H04N 1/00705* (2013.01); *H04N 1/00718* (2013.01); *H04N 1/00748* (2013.01); *H04N 1/00766* (2013.01); *H04N 1/00771* (2013.01)

(58) Field of Classification Search
None
See application file for complete search history.

(56) References Cited

U.S. PATENT DOCUMENTS

| | | | | |
|---|---|---|---|---|
| 6,191,405 | B1 * | 2/2001 | Mishima et al. | 250/208.1 |
| 6,433,896 | B1 * | 8/2002 | Ueda et al. | 358/488 |
| 2002/0033973 | A1 * | 3/2002 | Dolan et al. | 358/449 |
| 2011/0026084 | A1 | 2/2011 | Kato et al. | |

FOREIGN PATENT DOCUMENTS

| | | |
|---|---|---|
| JP | H09-321983 A | 12/1997 |
| JP | 2005005837 A | 1/2005 |
| JP | 2011035530 A | 2/2011 |

\* cited by examiner

*Primary Examiner* — Fred Guillermety
*Assistant Examiner* — Frantz Bataille
(74) *Attorney, Agent, or Firm* — Banner & Witcoff, Ltd.

(57) ABSTRACT

An image-reading device may include a reading unit and a control device. The control device may be configured to detect a candidate point for an edge of the document on each of a pair of parallel detection lines, obtain a tilt angle of a straight line extending between the detected candidate points in the read data and classify the obtained tilt angle into a plurality of range groups. Further, control device may be configured to count the number of obtained tilt angles in each of the plurality of range groups. Also, each of the range groups may be associated with a predetermined angle and when the count of one of the range groups meets predetermined criteria, the control device may assign the predetermined angle of the range group whose count meets the predetermined criteria to be a tilt angle of the document.

19 Claims, 7 Drawing Sheets

IMAGE-READING DEVICE AND COMPUTER-READABLE STORAGE MEDIUM

CROSS REFERENCE TO RELATED APPLICATION

This application claims priority from Japanese Patent Application No. 2011-214254, filed on Sep. 29, 2011, the entire subject matter of which is incorporated herein by reference.

TECHNICAL FIELD

The disclosure relates to a technique for obtaining a tilt angle of a document based on read data obtained by reading the document.

BACKGROUND

In a known technique for obtaining a tilt angle of a document in an image-reading device, the image-reading device detects a position of an edge of a document in read data obtained by reading the document and obtains a tilt angle of the document based on the detected edge position. For example, while moving a detection line from one side to the other side along a main-scanning direction, the image-reading device repeatedly detects, on the detection line extending along a sub-scanning direction, a candidate edge point having a pixel value that is different from a pixel value of pixels surrounding the candidate edge point by a threshold value or greater. Then, the image-reading device obtains an approximate straight line based on the detected candidate edge points to obtain a tilt angle of the document and determines the obtained tilt angle of the document as a detection result.

SUMMARY

However, the known technique may require longer time to complete the edge detection because the detection of candidate edge points is performed on a plurality of detection lines from the one side to the other side along the main-scanning direction.

Embodiments provide for a technique for detecting a tilt angle of a document with less time.

For example, aspects of the disclosure relate to an image-reading device which may include a reading unit and a control device. The control device may be configured to detect a candidate point for an edge of the document on each of a pair of parallel detection lines, obtain a tilt angle of a straight line extending between the detected candidate points in the read data and classify the obtained tilt angle into a plurality of range groups. Further, control device may be configured to count the number of obtained tilt angles in each of the plurality of range groups. Also, each of the range groups may be associated with a predetermined angle and when the count of one of the range groups meets predetermined criteria, the control device may assign the predetermined angle of the range group whose count meets the predetermined criteria to be a tilt angle of the document.

Further aspects of the disclosure relate to a non-transitory, computer-readable storage medium storing a computer program executable by a control device of a terminal device configured to be connected with an image-reading device configured to output read image data by reading a document. The program may instruct the control device to execute functions including detecting a candidate point for an edge of the document on each of a pair of parallel detection lines, and obtaining a tilt angle of a straight line extending between the detected candidate points in the read data. The program may also instruct the control device to execute functions including classifying the obtained tilt angle into a plurality of range groups and counting the number of obtained tilt angles in each of the plurality of range groups. Further, each of the range groups may be associated with a predetermined angle and when the count of one of the range groups meets predetermined criteria, assigning the predetermined angle of the range group whose count meets the predetermined criteria to be a tilt angle of the document.

The aspects of the disclosure may be accomplished in various manners, such as image-reading devices, terminal devices, document tilt detecting methods, computer programs for implementing functions of these devices or steps of the methods, or computer-readable storage medium storing the computer programs.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings.

DETAILED DESCRIPTION

One or more aspects of an embodiment are described in detail with reference to FIGS. 1-5.

Figure 1:
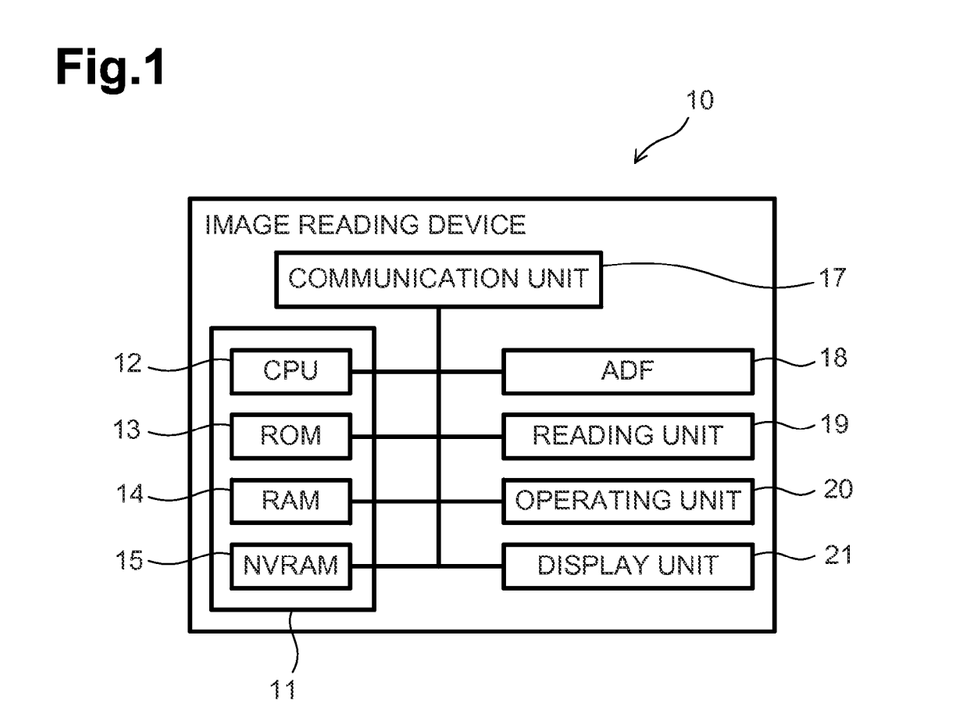
FIG. 1 is a schematic block diagram depicting an electric configuration of an image-reading device in an embodiment according to one or more aspects of the disclosure.

As depicted in FIG. 1, an image-reading device 10 may comprise a control device 11, a communication unit 17, an automatic document feeder ("ADF") 18, a reading unit 19, an operating unit 20, and a display unit 21.

Control device 11 may comprise an application-specific integrated circuit ("ASIC"), for example. Control device 11 may further comprise a central processing unit ("CPU") 12, a read-only memory ("ROM") 13, a random-access memory ("RAM") 14, and a nonvolatile RAM ("NVRAM") 15. ROM 13 may store control programs for performing various functions of image-reading device 10, e.g., tilt angle detecting process. CPU 12 may be configured to control functions of each unit of image-reading device 10 in accordance with the programs read from ROM 13. RAM 14 may be a volatile memory used as a workspace for CPU 12. NVRAM 15 may be configured to store read data of a document or various settings, for example.

Communication unit 17 may comprise an interface, e.g., Universal Serial Bus ("USB") or local-area network ("LAN"), and may be configured to allow image-reading device 10 to perform communication with an external device.

ADF 18 may comprise a tray (not depicted) on which one or more documents 30 may be mountable. ADF 18 may be configured to convey, one by one, documents 30 placed on the tray, to a reading position in reading unit 19. Reading unit 19 may comprise an image sensor, e.g., contact image sensor ("CIS") or charge-coupled device ("CCD"). Reading unit 19 may be configured to read line by line a surface of a document 30 along a main-scanning direction at the reading position.

Operating unit 20 may comprise a plurality of buttons and may be configured to accept instruction inputs from a user. Display unit 21 may comprise a display and a lamp, for example, and may be configured to display various messages or setting screens.

The tilt angle detecting process are now described with reference to FIGS. 2 to 5. In the tilt angle detecting process, a tilt angle of a document 30 may be detected based on read data of document 30.

Figure 2A:
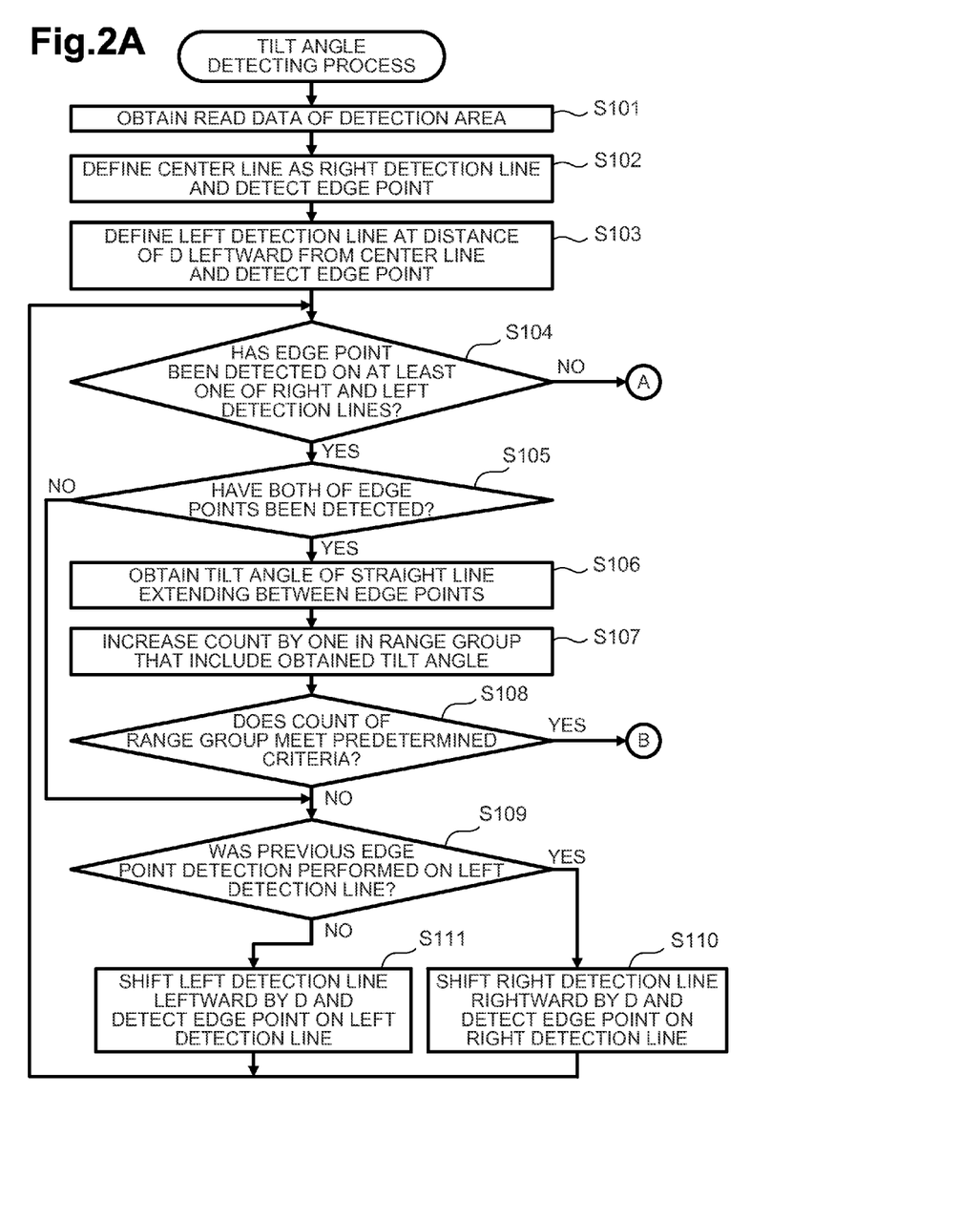
FIG. 2A is a flowchart depicting a tilt angle detecting process in the embodiment according to one or more aspects of the disclosure.
Figure 2B:
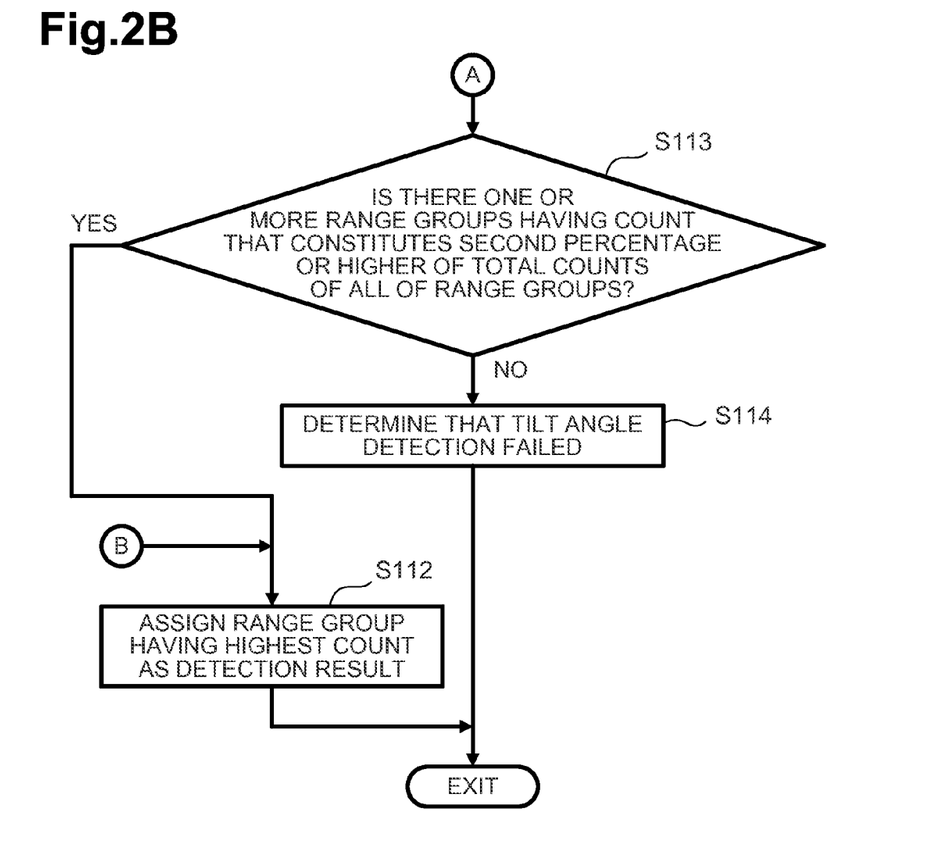
FIG. 2B is a flowchart depicting a tilt angle detecting process in the embodiment according to one or more aspects of the disclosure.

In a case where image-reading device 10 reads a plurality of documents 30 by ADF 18, every time ADF 18 scans and reads a document 30, the tilt angle detecting process may be performed on read data obtained by reading document 30. The tilt angle detecting process may be performed after a part, including at least a detection area A (described later), of a document 30 is read or after an entire area of a document 30 is read.

Figure 3:
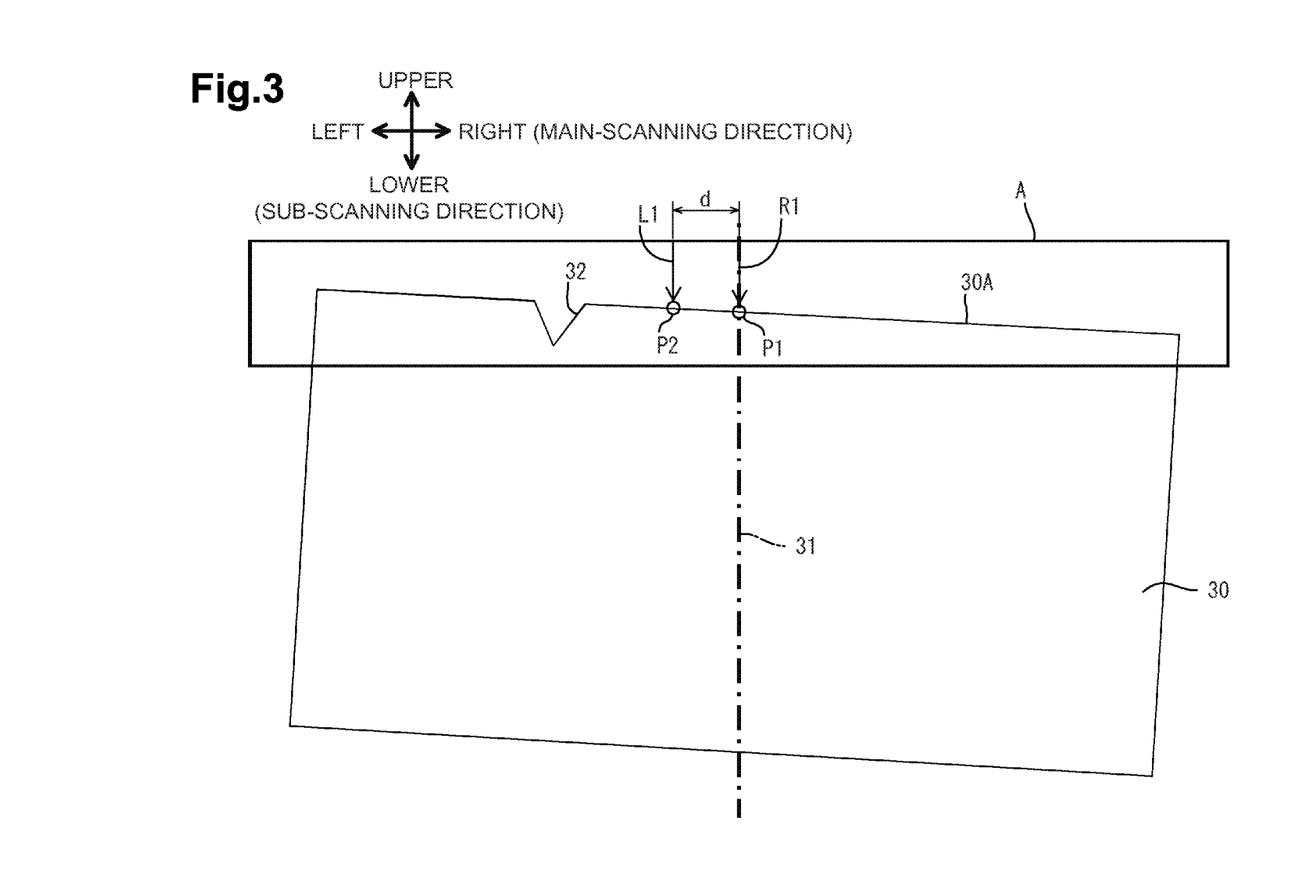
FIG. 3 is an explanatory diagram depicting a procedure of the tilt angle detecting process in the embodiment according to one or more aspects of the disclosure.

Upon starting the tilt angle detecting process, first, CPU 12 may obtain read data of detection area A, which may include a leading edge of a document 30, from a plurality of read data stored in RAM 14 (step S101). FIG. 3 depicts a part of an image included in the obtained read data. A reading-start side and a reading-end side in the sub-scanning direction may be also referred to as an "upper" side and a "lower" side, respectively, of read data. These directions may be also used in like drawings. Detection area A may be a rectangular area that may extend throughout the main-scanning direction and may include a leading edge 30A of a document 30 in the sub-scanning direction. Detection area A may refer to an area read for a lapse of a time from a predetermine time T1 after starting the document conveyance to a predetermined time T2. Predetermined time T1 may be a time at which a predetermined time period remains before a leading edge of a document 30 reaches the reading sensor. Predetermined time T2 may be a time at which a predetermined time period elapsed after the leading edge of document 30 passes the reading sensor.

CPU 12 may define a center line 31 of detection area A in the main-scanning direction as a right detection line R1. In this embodiment, when a document 30 is conveyed without being skewed, document 30 may be conveyed with its center aligned with center line 31 in the main-scanning direction. CPU 12 may detect a point P1 (hereinafter, referred to as "edge point") that may represent a position of leading edge 30A (a border between a document image and a background image) of document 30 on right detection line R1 (step S102). CPU 12 may search for a target pixel having a pixel value that is different from a pixel value of pixels surrounding the target pixel by a threshold value or greater along right detection line R1 from its upper end to lower end. When CPU 12 detects the target pixel, CPU 12 may set a coordinate of the target pixel to edge point P1.

More specifically, the detected edge point may be a pixel that may be a candidate edge point. A pixel constituting edge 30A of document 30 may be detected properly or a pixel constituting others, e.g., foreign matter or dirt adhering to document 30 or the reading position and its surroundings, may be detected, as the candidate edge point. The known technique may be adopted to the edge point detection. For example, an edge enhancement filter may be applied to detection area A in the read data. Then, a binarization may be performed in which a pixel having a value that is greater than or equal to a threshold value may be set to 1 (one) and a pixel having a value smaller than the threshold value may be set to 0 (zero). After the binarization, the pixel having a value of 1 (one) may be searched on the detection line.

CPU 12 may define a straight line that extends along the sub-scanning direction at a distance of d (inch) leftward from center line 31 as a left detection line L1 and detect an edge point P2 on left detection line L1 (step S103).

CPU 12 may determine whether edge point P1, P2 has been detected on at least one of right and left detection lines R1 and L1 (step S104). When at least one of edge points P1 and P2 has been detected (step S104:YES), CPU 12 may determine whether both of edge points P1 and P2 have been detected (step S105).

When both of edge points P1 and P2 have been detected (step S105:YES), CPU 12 may obtain a tilt angle of a straight line extending between edge point P1 and edge point P2 with respect to the main-scanning direction (step S106).

CPU 12 may classify tilt angles into a plurality of range groups and may allocate space for counting the obtained number of tilt angles in each range group in RAM 14. CPU 12 may increase by one a count of a range group that may include the obtained tilt angle of the straight line (step S107). An initial value of the count may be 0 (zero) in each range group.

For example, the range groups may be grouped in 0.25° increments and each range group may be defined as "(0.25x−0.125)° or more to less than (0.25x+0.125)° ("x" is a whole number)". CPU 12 may count the detected number of tilt angles included in one of the following range groups, for example:

0.625° or more to less than 0.875° (median value: 0.750°)
0.375° or more to less than 0.625° (median value: 0.500°)
0.125° or more to less than 0.375° (median value: 0.250°)
−0.125° or more to less than 0.125° (median value: 0.000°)
−0.375° or more to less than −0.125° (median value: −0.250°)

For example, when the detected tilt angle is 0.500°, the count of a range group of "0.375° or more to less than 0.625°" may be increased by one. Here, in the coordinate system, when a right edge point is above a left edge point, a tilt angle is indicated by a positive value. When a right edge point is below a left edge point, a tilt angle may be indicated by a negative value. The median value may be a midpoint value in each range group, i.e., a class value to be used for dividing the tilt angles into the plurality of range groups.

Then, CPU 12 may determine whether the count of the range group in which the count has been increased by one meets predetermined criteria (step S108). In this embodiment, the criteria may include requirements that the count of one of the range groups has been increased predetermined successive times (twice or more successive times), e.g., five times, the count of the one of the range groups is the highest in all range groups, and a percentage of the count of the one of the range groups with respect to the total counts of all of the range groups is a first percentage (an example of a first value), e.g., 50%, or higher.

When the count of the target range group does not meet the criteria (step S108:NO) or when one of the right and left edge points has not been detected in step S105 (step S105:NO), CPU 12 may determine whether the previous edge point detection was performed on left detection line L1 (step S109). When the previous edge point detection was performed on left detection line L1 (step S109:YES), CPU 12 may shift right detection line R1 rightward by d (inch) and detect an edge point on right detection line R2 (step S110). When the previous edge point detection was performed on right detection line R2 (step S109:NO), CPU 12 may shift left detection line L1 leftward by d (inch) and detect an edge point on left detection line L2 (step S111).

The routine may move back to step S104 and CPU 12 may repeatedly perform the edge point detection on the right and left detection lines, respectively, in a similar manner. When the detection line cannot be shifted any further to the right in step S110 or to the left in step S111 because the detection line reached the end of detection area A, CPU 12 may determine that an edge point has not been detected.

As described above, in the tilt angle detecting process, first, CPU 12 may detect edge points on a pair of right and left detection lines, respectively, and obtain a tilt angle of a straight line extending between the detected edge points. When the criteria are not met in step S108, CPU 12 may shift one of the right and left detection lines outward with respect to the center line to detect an edge point and obtain a tilt angle of a straight line extending between a newly-detected edge point and one of the previously-detected edge points. CPU 12 may perform this procedure repeatedly while alternately shifting the right and left detection lines outward unless the criteria are not met in step S108.

Figure 4:
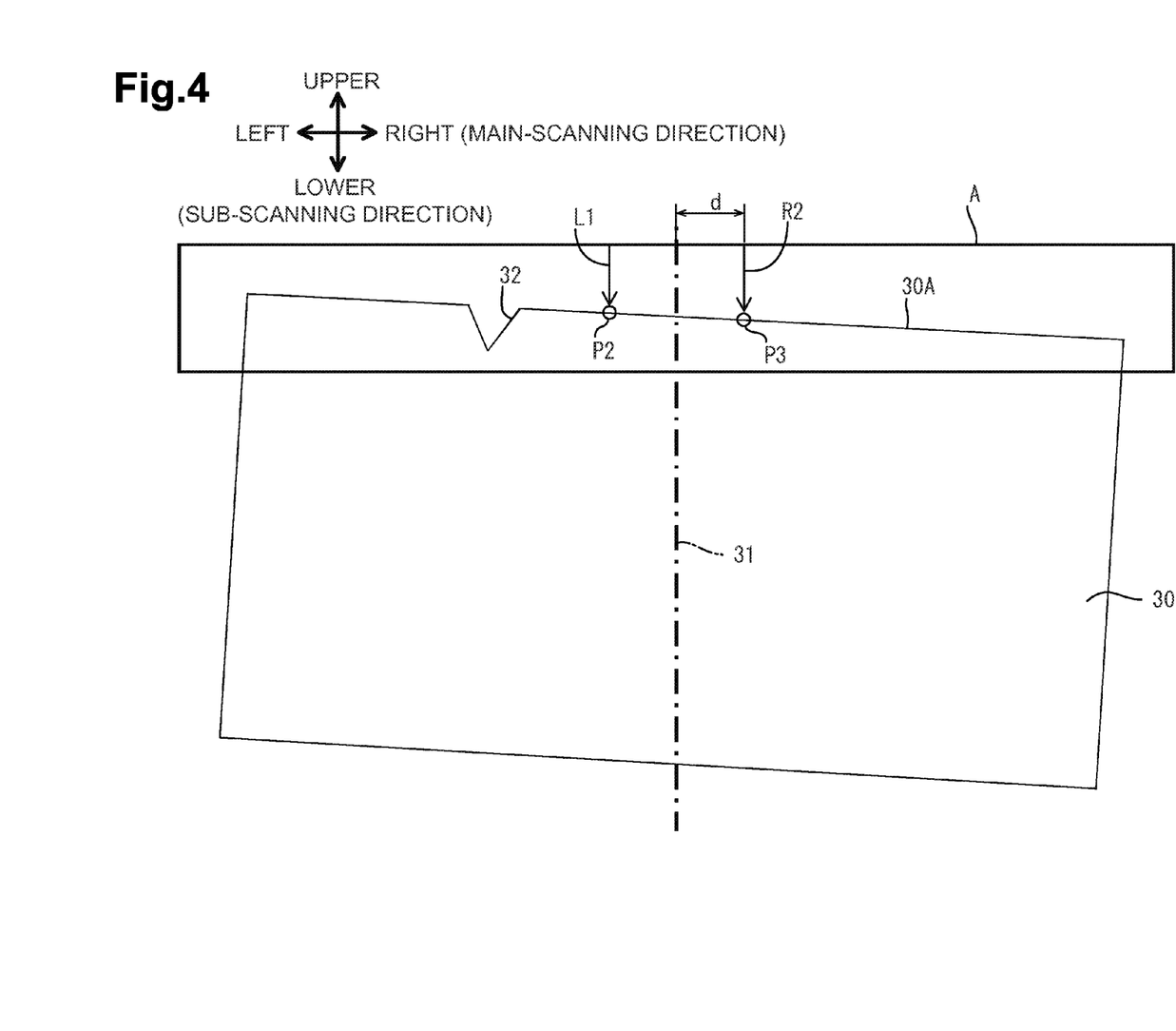
FIG. 4 is an explanatory diagram depicting the procedure of the tilt angle detecting process in the embodiment according to one or more aspects of the disclosure.

As depicted in FIG. 3, first, CPU 12 may detect edge points P1, P2 on right and left detection lines R1, L1, respectively, and obtain a tilt angle of a straight line extending between detected edge points P1 and P2. Then, as depicted in FIG. 4, CPU 12 may detect an edge point P3 on a right detection line R2 that may be shifted rightward by d (inch) from right detection line R1. Then, CPU 12 may obtain a tilt angle of a straight line extending between edge point P3 detected on right detection line R2 and edge point P2 detected on left detection line L1. Based on the obtained tilt angle, CPU 12 may increase by one the count of the range group that may include the obtained tilt angle.

Figure 5:
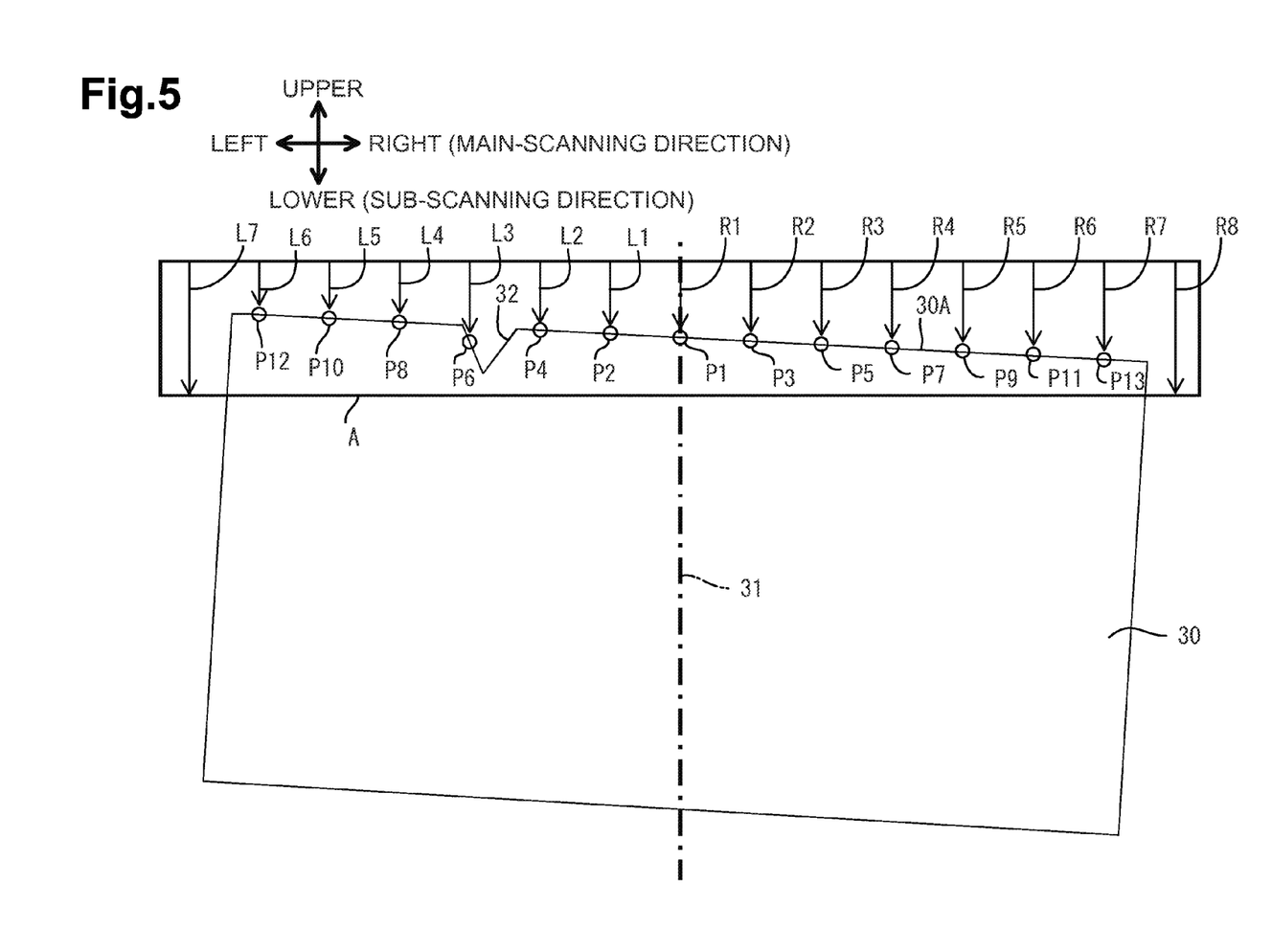
FIG. 5 is an explanatory diagram depicting the procedure of the tilt angle detecting process in the embodiment according to one or more aspects of the disclosure.

Then, as depicted in FIG. 5, CPU 12 may detect an edge point P4 on a detection line L2 that may be shifted leftward by d (inch) from left detection line L1. Then, CPU 12 may obtain a tilt angle of a straight line extending between edge point P4 detected on left detection line L2 and edge point P3 detected on right detection line R2. Based on the obtained tilt angle, CPU 12 may increase by one the count of the range group that may include the obtained tilt angle. As described above, every time obtaining a tilt angle of a straight line, CPU 12 may alternately shift the right and left detection lines outward. Thus, a distance between a right edge point and a left edge point may become longer gradually in the main-scanning direction.

When document 30 has a damaged portion 32, e.g., cut, CPU 12 may detect an edge point P6 at a position deviated from a proper position at which edge point P6 is supposed to be present on edge 30A. A tilt angle of a straight line extending between edge point P6 and an edge point P5 or P7 may be out of the range group that may include the tilt angles obtained based on the edge points found at proper positions on edge 30A. Therefore, CPU 12 may increase a count of a different group range. The same situation may occur when foreign matter or dirt is detected as an edge point.

When the count of the target range group meets the criteria (step S108:YES), CPU 12 may assign the target range group having the highest count (the median value) as a detection result (step S112) and exit the tilt angle detecting process. As described above, when the count of one of the range groups meets the criteria, the tilt angles included in the range group may probably be obtained based on the edge points found on edge 30A of document 30 but not be obtained based on the edge point found on damaged portion 32, foreign matter or dirt on document 30. Accordingly, accuracy of the tilt angle detection may be maintained. CPU 12 may end the tilt angle detecting process when the count of one of the range groups meets the criteria. Therefore, the tilt angle detecting process may be completed with less time.

CPU 12 may determine that edge points have not been detected on both of the right and left detection lines in step S104 when the right and left detection lines, e.g., detection lines L7, R8, reach the respective ends of detection area A (step S104:NO) as depicted in FIG. 5. Then, CPU 12 may determine whether there is one or more range groups having the count that constitutes a second percentage (an example of a second value) or higher of the total counts of all of the range groups (step S113). The second percentage, e.g., 30%, may be lower than the first percentage.

When there is one or more range groups having the count that constitutes the second percentage or higher of the total counts of all of the range groups (step S113:YES), CPU 12 may assign the range group having the highest count as a detection result (step S112) and exit the tilt angle detecting process. When there is no range group having the count that constitutes the second percentage or higher of the total counts of all of the range groups (step S113:NO), CPU 12 may determine that the tilt angle detection failed (step S114) and exit the tilt angle detecting process.

When the detection result is obtained from the tilt angle detecting process, CPU 12 may perform tilt correction on the read data of corresponding document 30 to correct the tilt of document 30. CPU 12 may store the corrected read data in NVRAM 15.

According to the one or more aspects of the embodiment, as described above, CPU 12 may detect an edge point on each of a pair of detection lines and obtain a tilt angle of a straight line extending between the detected edge points (step S106). CPU 12 may divide tilt angles into a plurality of range groups and increase by one a count of a range group that may include the obtained tilt angle of the straight line (step S107). When the count of a target range group does not meet the criteria (step S108:NO), CPU 12 may shift one of the right and left detection lines (steps S110 and S111) and repeatedly perform the tilt angle detection. When the count of a target range group meets the criteria (step S108:YES), CPU 12 may assign the target range group as a detection result (step S112).

With this configuration, when the count of one of the range groups meets the criteria, CPU 12 may determine the tilt angle (the median value) of the one of the range groups as a tilt angle of document 30. According to the one or more aspects of the embodiment, the establishment of the appropriate criteria may provide a detection result with less time as compared to a case where edge points may be detected at all times on a certain number of detection lines, e.g., all of detection lines L1-L7 and R1-R8.

The distance between the right detection line and the left detection line may become longer every time the tilt angle detection is performed. This configuration may provide a wide range of variations in the distance between the right detection line and the left detection line.

In the above-described embodiment, every time a tilt angle of a straight line is detected, one of the pair of detection lines may be shifted outward from the substantially center of a document 30. However, for example, when a detection line is shifted from one side to the other side of a detection area A along the main-scanning direction in read data, an edge 30A of a document 30 may not be present in the vicinity of the one side of detection area A depending on the position of document 30 or the size of document 30. Under this situation, an edge point may not be detected in the first of the next few detections. In the above-described embodiment, the pair of detection lines may be shifted outward from the substantially center of a document 30, and thus, an edge point may be detected in the first detection. Accordingly, this configuration may provide a desired detection result with less time.

The pair of detection lines may be positioned on opposite sides of center line 31 in detection area A with respect to the main-scanning direction. In particular, a document 30 may pass through the midsection of detection area A with respect to the main-scanning direction when ADF 18 reads document 30. Accordingly, an edge point may be detected in read data of document 30 in the first detection.

The criteria may include the requirement that the count of the one of the range groups has been increased predetermined successive times (twice or more successive times). When the count of one of the range groups has been increased predetermined successive times, edge 30A of document 30 but not noises may be probably detected. Therefore, the accuracy of the tilt angle detection may be maintained.

The criteria may include the requirement that the percentage of the count of the one of the range groups with respect to the total counts of all of the range groups is the first percentage or higher. When one of the range groups has the count that constitutes the first percentage or higher with respect to the total counts of all of the range groups, the tilt angles included in the range group may probably be obtained based on the edge points found on edge 30A of document 30. Therefore, the accuracy of the tilt angle detection may be maintained while an influence of noises may be reduced.

When the edge point detection cannot be performed on a new detection line, the range group having the count that constitutes the second percentage or higher and has the highest count in all range groups may be determined as the detection result. Accordingly, the detection result may be obtained although the detection result is not determined because an applicable range group is not present for the requirement that the percentage of the count of the range group with respect to the total counts of all of the range groups is the first percentage or higher.

The criteria may include the requirement that the count of the one of the range groups is the highest in all range groups. When the one of the range groups has the highest count, the tilt angles included in the range group may probably be obtained based on the edge points found on edge 30A of document 30. Therefore, the accuracy of the tilt angle detection may be maintained.

While the invention has been described in detail with reference to the specific embodiment thereof, it would be apparent to those skilled in the art that various changes, arrangements and modifications may be applied therein without departing from the spirit and scope of the invention.

In the above-described embodiments, the one or more aspects of the disclosure may be applied to the image-reading device. Nevertheless, in other embodiments, for example, the one or more aspects of the disclosure may be applied to multifunction peripheral devices having one or more of a printing function and a facsimile communication function as well as the reading function, and may also be applied to terminal devices.

Figure 6:
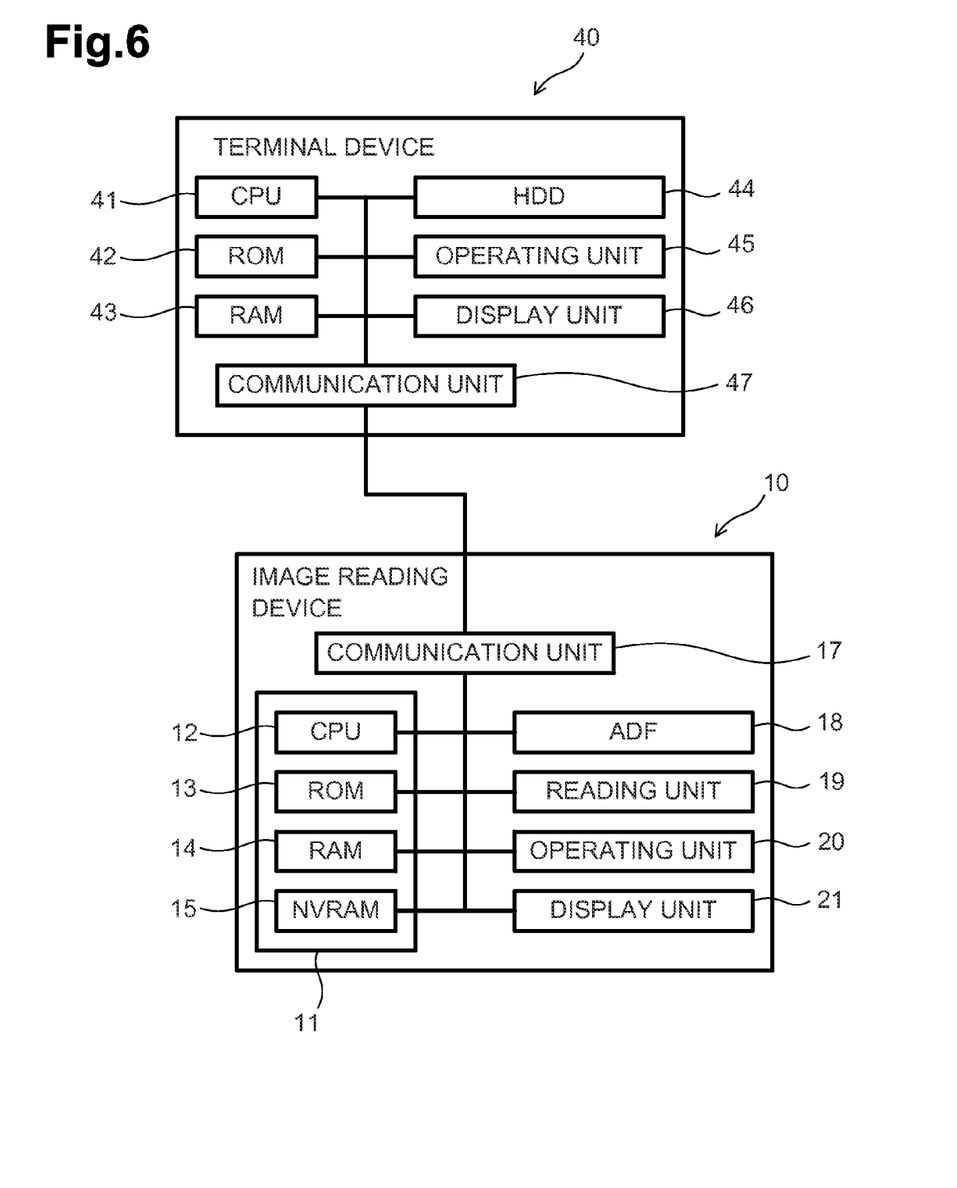
FIG. 6 is a schematic block diagram depicting an image-reading device and a terminal device connected with the image-reading device in another embodiment according to one or more aspects of the disclosure.

One or more aspects of another embodiment of the disclosure are described with reference to FIG. 6. A terminal device 40 may be a general-purpose computer and may comprise a CPU 41, a ROM 42, a RAM 43, a HDD 44, an operating unit 45, a display unit 46, and a communication unit 47. HDD 44 may store an operating system ("OS"), a scanner driver, and programs for performing the tilt angle detecting process. Communication unit 47 may comprise an interface, e.g., USB or LAN and may be configured to allow terminal device 40 to be connected with image-reading device 10.

When the user selects an execution of reading on operating unit 45 after placing one or more documents 30 on image-reading device 10, CPU 41 of terminal device 40 may send a reading execution instruction to image-reading device 10 via communication unit 47. Upon receipt of the reading execution instruction, CPU 12 of image-reading device 10 may send terminal device 40 read data of document 30 obtained by reading document 30 by reading unit 19. Then, upon receipt of the read data, CPU 41 of terminal device 40 may perform the tilt angle detecting process of FIG. 2 to detect a tilt angle of document 30 and correct the read data based on the detected tilt angle.

The criteria for determining the detection result of a tilt angle of a document may not be limited to the specific embodiments thereof. In other embodiments, for example, the criteria may include one or more of requirements, for example, that a) the count of one of the range groups has been increased predetermined successive times (twice or more successive times), b) the count of one of the range groups reached a predetermined value, e.g., 20, or higher and a percentage of the count of the one of the range groups with respect to the total counts of all of the range groups is a predetermined percentage, and c) the count of one of the range groups reached a predetermined value, e.g., 10, or higher. The criteria may include or a combination of one or more of the above requirements and one or more of other requirements.

In the above-described embodiment, the one or more aspects of the disclosure may be adopted to image-reading device 10 configured to read a document 30 by ADF 18. Nevertheless, in other embodiments, a flatbed-type image-reading device configured to read a document placed on a glass surface while moving a read unit.

The number of detection lines, the sequence of the edge point detection, or the position where an edge point may be detected may be changed appropriately. For example, when a document is conveyed with aligned to one side, a detection line may be shifted from the one side toward the other side to detect an edge point every time a tilt angle of a straight line extending between detected edge points is detected. In the above-described embodiments, one of the right and left detection lines may be shifted every time a tilt angle of a straight line extending between detected edge points is detected. Nevertheless, in other embodiments, for example, both of the right and left detection lines may be shifted at the same time every time a tilt angle of a straight line extending between detected edge points is detected. The pair of detection lines may be shifted inward from the outside or may be shifted at regular intervals every time a tilt angle of a straight line between detected edge points is detected.

In the above-described embodiments, single CPU 12 may perform all of the processes. Nevertheless, the invention may not be limited to the specific embodiment thereof, and a plurality of CPUs, a special application specific integrated circuit ("ASIC"), or a combination of a CPU and an ASIC may be used to perform the processes.

What is claimed is:

1. An image-reading device comprising:
   a reading unit configured to generate read data by reading a document; and
   a control device configured to perform a detecting process comprising:
      detect one candidate point for one edge of the document on one new detection line along a sub-scanning direction;
      detect a next candidate point for the one edge of the document on one parallel detection line with respect to the one new detection line, only when a number of the detected candidate points is less than two;
      obtain a tilt angle, with respect to a main-scanning direction, of a straight line extending between a newest pair of candidate points in the read data, the newest pair consisting of the detected one candidate point and next candidate point;
      classify the obtained tilt angle into a plurality of range groups, each of the range groups associated with a predetermined angle;
      count the number of obtained tilt angles in each of the plurality of range groups;
      when the number of obtained tilt angles in one of the range groups meets predetermined criteria, assign the predetermined angle of the range group whose number meets the predetermined criteria to be a tilt angle of the document; and
      when the number of obtained tilt angles in each of the range groups does not meet the predetermined criteria, shift at least one of the one new detection line and the one parallel detection line to another position and perform the detecting process again.

2. The image-reading device according to claim 1, wherein the control device is configured to change a distance between the one new detection line and the one parallel detection line every time the detecting process is performed.

3. The image-reading device according to claim 2, wherein the control device is configured to, when performing the detecting process, shift the one new detection line further away from the one parallel detection line with respect to the position of the one new detection line when a previous detecting process was performed.

4. The image-reading device according to claim 3, wherein the control device is configured to, when performing the detecting process, shift the one parallel detection line further away from the one new detection line with respect to the position of the one parallel detection line when the previous detecting process was performed.

5. The image-reading device according to claim 1, wherein the one new detection line and the one parallel detection line are positioned on opposite sides of a center of the read data.

6. The image-reading device according to claim 1, wherein the predetermined criteria includes a requirement that the number of obtained tilt angles in one of the range groups has been increased two or more successive times.

7. The image-reading device according to claim 1, wherein the predetermined criteria includes a requirement that a percentage of the number of obtained tilt angles in the range group whose number of obtained tilt angles meets the predetermined criteria is at least a first predetermined percentage with respect to a total number of obtained tilt angles in all of the range groups.

8. The image-reading device according to claim 7, wherein when the control device cannot shift the one new detection line or the one parallel detection line further and the percentage of each of the numbers of obtained tilt angles in the range groups with respect to the total number of obtained tilt angles in all of the range groups is not at least the first percentage, the control device is configured to determine whether a range group has a number of obtained tilt angles that constitutes at least a second percentage of the total number of obtained tilt angles in all of the range groups and has a highest number of obtained tilt angles in all of the range groups, and assign the predetermined angle of the range group whose number of obtained tilt angles has at least the second percentage of the total number of obtained tilt angles of all of the range groups and has the highest number of obtained tilt angles of all of the range groups to be a tilt angle of the document, wherein the second percentage is lower than the first percentage.

9. The image-reading device according to claim 1, wherein the criteria includes a requirement that the number of obtained tilt angles is the highest of all range groups.

10. The image-reading device according to claim 1, comprising an automatic document feeder configured to feed one or more documents, one by one, to a reading position in the reading unit.

11. A non-transitory, computer-readable storage medium storing a computer program executable by a control device of a terminal device configured to be connected with an image-reading device configured to output read image data by reading a document, the computer program instructing the control device to execute functions comprising:
   detecting ones candidate point for one edge of the document on one new detection line along a sub-scanning direction;
   detecting a next candidate point for the one edge of the document on one parallel detection line with respect to the one new detection line, only when a number of the detected candidate points is less than two;
   obtaining a tilt angle, with respect to a main-scanning direction, of a straight line extending between a newest pair of candidate points in the read data, the newest pair consisting of the detected one candidate point and the next candidate point;
   classifying the obtained tilt angle into a plurality of range groups, each of the range groups associated with a predetermined angle;
   counting the number of obtained tilt angles in each of the plurality of range groups;
   when the number of obtained tilt angles in one of the range groups meets predetermined criteria, assigning the predetermined angle of the range group whose number of obtained tilt angles meets the predetermined criteria to be a tilt angle of the document; and
   when the number of obtained tilt angles of each of the range groups does not meet the predetermined criteria, shifting at least one of the one new detection line and the one parallel detection line to another position and perform the detecting process again.

12. The image-reading device according to claim 1, wherein each of the one parallel detection line and the one new detection line is distinct from edges of the document.

13. The image-reading device according to claim 1, wherein the edge of the document is approximately in the main-scanning direction.

14. The image-reading device according to claim 1, wherein when the document is conveyed without being skewed, the document is conveyed with a center of the document aligned with a center line of a detection area in the main-scanning direction.

15. The image-reading device according to claim 1, wherein the edge of the document is a leading edge of the document.

16. The image-reading device according to claim 1, wherein the control device is configured to:
   in response to assigning the predetermined angle of the range group whose number of obtained tilt angles meets the predetermined criteria to be a tilt angle of the document, discontinuing the detecting process for the document.

17. The image-reading device according to claim 1, wherein an initial number of obtained tilt angles in each of the range groups is zero.

18. The image-reading device according to claim 1, wherein classifying the obtained tilt angle into a plurality of range groups comprises classifying the obtained tilt angle into a same range group of the range groups as a second tilt angle, wherein the obtained tilt angle is different from the second tilt angle, and the obtained tilt angle is not perpendicular to the second tilt angle.

19. The image-reading device according to claim 8, wherein when no range group has the number of obtained tilt angles that constitutes at least the second percentage of the total number of obtained tilt angles in all of the range groups, the control device is configured to:
   determine that the detecting process failed; and
   exit the detecting process.

* * * * *